United States Patent
Balakrishnan et al.

(10) Patent No.: US 9,628,465 B2
(45) Date of Patent: *Apr. 18, 2017

(54) STATE DRIVEN ORCHESTRATION OF AUTHENTICATION COMPONENTS IN AN ACCESS MANAGER

(71) Applicant: Oracle International Corporation, Redwood Shores, CA (US)

(72) Inventors: Aarathi Balakrishnan, Bangalore (IN); Ramya Kukkehali Subramanya, Bangalore (IN); Deepak Ramakrishnan, Banglore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/754,238

(22) Filed: Jun. 29, 2015

(65) Prior Publication Data

US 2015/0319154 A1 Nov. 5, 2015

Related U.S. Application Data

(63) Continuation of application No. 13/749,534, filed on Jan. 24, 2013, now Pat. No. 9,100,387.

(51) Int. Cl.
*H04L 29/06* (2006.01)
*H04L 29/08* (2006.01)

(52) U.S. Cl.
CPC ............ *H04L 63/08* (2013.01); *H04L 63/102* (2013.01); *H04L 67/02* (2013.01)

(58) Field of Classification Search
CPC ....... H04L 63/08; H04L 63/102; H04L 67/02; H04L 9/3231; H04L 9/3215; H04L 9/326;
(Continued)

(56) References Cited

U.S. PATENT DOCUMENTS 6,134,594 A 10/2000 Helland et al.
6,691,232 B1 * 2/2004 Wood .................. H04L 63/0815
726/18

(Continued)

FOREIGN PATENT DOCUMENTS

GB 2472349 A 2/2011
KR 2002 083551 A 11/2002

OTHER PUBLICATIONS

"Access control policy-Hitachi ID Privileged Access Manager," Hitachi ID Systems, Inc., http://hitachi-id.com/privileged-access-manager/security/access-conrol.html, retrieved Mar. 30, 2012, 1 page.

(Continued)

*Primary Examiner* — Saleh Najjar
*Assistant Examiner* — Shu Chun Gao
(74) *Attorney, Agent, or Firm* — Kilpatrick Townsend & Stockton LLP

(57) ABSTRACT

Methods and systems are described for state driven orchestration of authentication components to access a resource protected by an access manager framework. In response to a client request for a protected resource, relevant authentication components and their respective order are determined. Upon successful authentication of the first authentication component, proper state information of the authentication process is stored by the client indicating the next authentication component. In response to a request for additional credential information for the authentication process from the next authentication component, the client provides the stored state information so that the authentication process continues with the second authentication component according to the determined order of the authentication components within an authentication process.

19 Claims, 8 Drawing Sheets

(58) Field of Classification Search
CPC ... H04L 9/32; H04L 63/0807; H04L 63/0892; H04W 12/06
See application file for complete search history.

(56) References Cited

U.S. PATENT DOCUMENTS

| | | |
|---|---|---|
| 7,065,568 B2 | 6/2006 | Bracewell et al. |
| 8,006,289 B2 | 8/2011 | Hinton et al. |
| 8,639,629 B1* | 1/2014 | Hoffman ............... G06Q 20/20 705/44 |
| 8,689,303 B1* | 4/2014 | Abidogun ............... H04L 63/08 709/223 |
| 2009/0158399 A1* | 6/2009 | Cooley ............... G06F 21/31 726/4 |
| 2009/0328186 A1* | 12/2009 | Pollutro ............... G06F 21/31 726/13 |
| 2010/0281517 A1 | 11/2010 | Okada et al. |
| 2011/0219439 A1* | 9/2011 | Strode ............... H04L 9/3231 726/9 |
| 2012/0017260 A1 | 1/2012 | Narain et al. |

OTHER PUBLICATIONS

"Distinguishing step-up from multi-factor authentication," Tivoli, http://publib.boulder.ibm.com/infocenter/tivihelp/v2rl/index.jsp?topic=%2Fcom.ibm.itame2.doc_5.1%2Fam51_admin183.htm, retrieved Mar. 30, 2012, 1 page.
CA SiteMinder Integrated Documents r12.5.pdf, CA SiteMinder Integrated Dcouments r12.5, 2012, 41 pages.
Non-Final Office Action mailed Dec. 4, 2014 in U.S. Appl. No. 13/749,534, 14 pages.
Notice of Allowance mailed Apr. 15, 2015 in U.S. Appl. No. 13/749,534, 8 pages.

\* cited by examiner

STATE DRIVEN ORCHESTRATION OF AUTHENTICATION COMPONENTS IN AN ACCESS MANAGER

CROSS-REFERENCES TO RELATED APPLICATIONS

This application is a continuation of application Ser. No. 13/749,534, filed Jan. 24, 2013, entitled "STATE DRIVEN ORCHESTRATION OF AUTHENTICATION COMPONENTS IN AN ACCESS MANAGER," the contents of which is hereby incorporated in its entirety by reference for all purposes.

BACKGROUND OF THE INVENTION

1. Field of Art

The present disclosure relates generally to the field of computer resource management. Specifically presented are methods and systems for computer resource access control and user identity administration.

2. Description of Related Art

Sharing and distribution of information has become the main focus in the computer age. Modern sharing and distribution methods and systems provide resource access regulations. This allows for increased security, reduced operational costs, and improved usability of shared and/or distributed resources.

Companies and agencies providing information would benefit from resource access regulations provided by sharing and distribution methods and systems. For example, these organizations may regulate their employees' access to various corporate data to control who can access what resource. For instance, an employee portal system may be protected with a username and password, but for a more sensitive HR self-service application that deals with sensitive data, users may be required to be authenticated using an RSA SecurID® token, thus providing a higher level of security to more sensitive resources or applications. Therefore, access management solutions have been developed to implement regulations for accessing resources for resource providers.

Access management solutions may provide centralized authentication, authorization, and auditing to enable single sign-on and secure access control using enterprise resources. For example, Oracle Access Manager, a product of Oracle International Corporation of Redwood Shores in California, is configured to support Enterprise Resource Planning (ERP), Customer Relationship Management (CRM), and Collaboration suite applications.

Generally, access managers authenticate users and systems attempting to access resources protected by access managers with authentication methods using different types of credentials, such as a username or password. In some instances, the authentication may include complex authentication methods and processes that can be optimized to improve the performance of the access manager.

There exists a need in the art for better authentication techniques using an access manager to more easily provide secure and regulated access to resources, especially in widely growing complex enterprise environments.

BRIEF SUMMARY

Embodiments in accordance with the present disclosure relate to access management of resources. An access manager may use different authentication processes to manage access to resources being protected by access manager. For example, a multi-step authentication process may be used to protect a resource, where each component of the authentication process may be orchestrated and executed based on an execution state of the authentication process.

Some embodiments use an authentication context to provide the execution state of the authentication process, where the authentication context may be represented as an object, for example a Java® object, to keep track of the execution state of the authentication process. In an embodiment, the authentication context may be implemented as an HTTP (Hypertext Transfer Protocol) cookie. In another embodiment, the authentication context may be implemented as an encrypted cookie.

Some embodiments in accordance with the present disclosure relate to a method for state driven orchestration of authentication components to access a resource protected by an access manager framework. The method includes receiving a request to access a resource from a client, determining required authentication components and their order for the requested resource, and requesting a first set of credential information required for a first authentication component to authenticate the client requesting access to the resource.

The method further includes generating an authentication context, which is stored at the client, including information indicating a second authentication component of the determined order of the required authentication components to grant access to a protected resource upon successful validation of the received first set of credential information, requesting a second set of credential information required for a second authentication component of the determined sequential order to authenticate the client requesting access to the resource.

The method further includes receiving the second set of credential information along with the authentication context from the client, determining which authentication component to receive the second set of credential information based at least in part upon the authentication context received from the client, and sending the second set of credential information to the second authentication component.

Yet other embodiments relate to systems and non-transitory machine-readable storage media that employ or store instructions for the methods as described above.

A further understanding of the nature and the advantages of the embodiments disclosed and suggested herein may be realized by reference to the remaining portions of the specification and the attached drawings.

BRIEF DESCRIPTION OF THE DRAWINGS

Various embodiments in accordance with the present invention will be described with reference to the drawings, in which.

The figures will be used below to illustrate different embodiments in accordance with the invention. The figures are specific examples of embodiments and should not be interpreted as limiting embodiments, but rather exemplary forms and procedures.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details.

Generally described are methods and systems for access management of resources. Access managers use different authentication methods and systems to manage access to resources being protected by access managers. Different authentication methods may use multiple authentications components to authenticate a user or system requesting access to a resource. These authentication components may be orchestrated and executed during the authentication process. An execution state of the authentication process with respect to authentication components may be determined and stored throughout the authentication process.

One aspect offers to request a set of credential information from a client requesting access to a resource. The set of credential information is required for an authentication component from the multiple authentication components available in the authentication process of the resource, which have been orchestrated prior to a request for credential information.

The credential information is received from the client and is consumed by the proper authentication component of the authentication process, where the proper authentication component is identified using execution state information of the authentication process.

Figure 1:
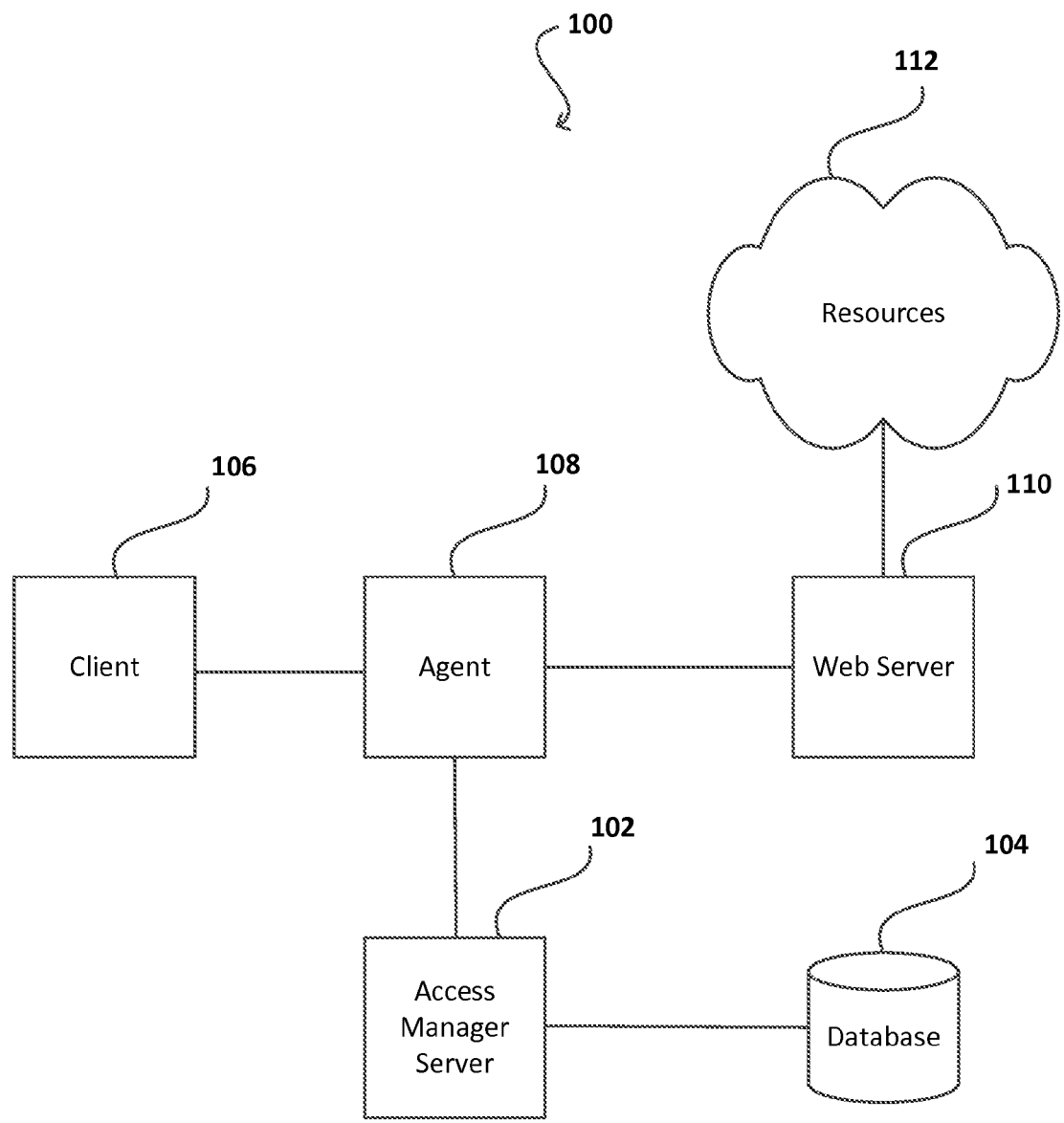
FIG. 1 illustrates components of an exemplary system in accordance with an embodiment.

FIG. 1 illustrates an exemplary system for an access management operable to protect resources in accordance with an embodiment. Access manager server 102 may be a server that enforces access policies on web and non-web resources, which may specify who can or cannot access a particular resource.

Access policies may restrict access to particular resources by user, static or dynamic group memberships, time of the day or week, IP (Internet Protocol) addresses, etc. The access manager server may provide dynamic policy evaluation as clients access resources and provide authentication and authorization services. Access manager server 102 is connected to one or more databases 104 to utilize information stored in the one or more databases 104 while validating credential information.

Database 104 may store policy data related to configuration and workflow related data. For example, database 104 may include data regarding security component orchestration. Database 104 may also contain user, group, and organization data to facilitate access policy management that may be performed by the access management system components, for example access manager server 102.

Agent 108 is a policy enforcement agent that acts as a filter for resource requests. Agent 108 may intercept resource requests and apply access policies to determine whether the requested resources are protected by the access management system. If so, the resource request is forwarded to access management server 102 to determined whether the client requesting the protected resource may access the protected resource. For example, Webgate, an out of the box solution developed by Oracle International Corporation may be used as an agent so that it can filter the resource requests. It should be noted that agent 108 may be a hardware structure or a combination of hardware and software implementations, in accordance with some embodiments.

Agent 108 receives access requests from client 106, which may be an end-user, (e.g., an employee, customer, supplier, etc.), a system, or a software program requesting access to a resource. If agent 108 determines that the requested resource is not a protected resource or the client is authorized to access the protected resource, the client may be connected to a server, for example web server 110, to receive resource 112. Web server 110 may present information requested by providing web based (HTTP) content to the client 106. In some embodiments resource 112 may be presented as HTML so that it may be rendered in the client's browser.

Figure 2:
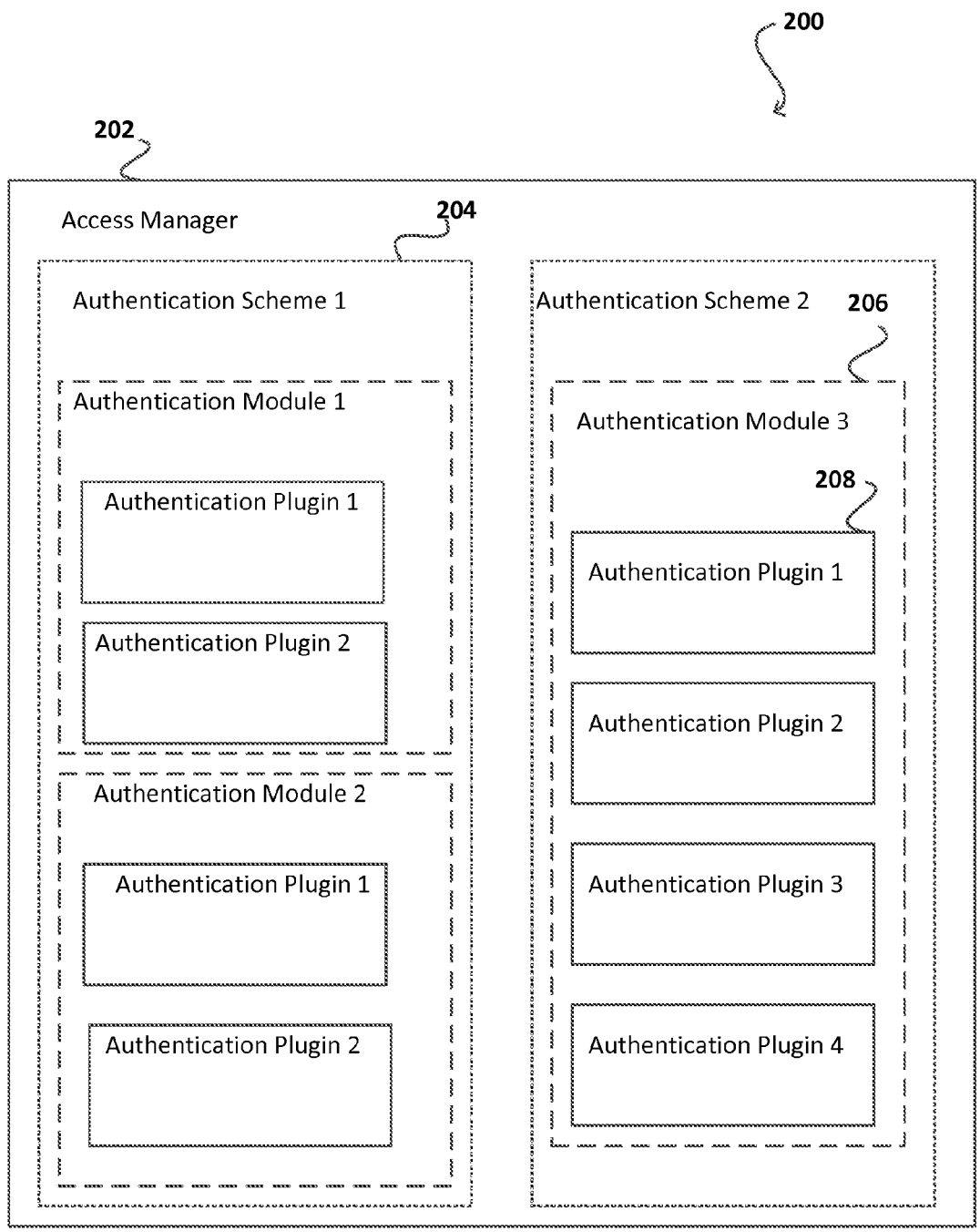
FIG. 2 illustrates components of an exemplary access manager framework in accordance with an embodiment.

Access managers usually have multiple components for authentication and/or authorization processes. As shown in FIG. 2, access manager 202 may include one or more authentication schemes. Authentication schemes protect specific resources using one or more access policies. Authentication scheme 204 may include details about a credential collection mechanism and type of credential collector used to collect credentials. For example, credential collection may occur using an HTTP(S) transport channel that is handling HTTP(S) request from a remote client.

In an embodiment, the authentication scheme may identify a redirect URL (Uniform Resource Locator), which is used to notify the client of the success or failure of the authentication and/or authorization processes. In addition, the authentication scheme 204 may identify an authentication level indicating the trust level to protect transport of credentials from the client. In some embodiments, the authentication level maybe an integer assigned from 0 to 99. For example, an LDAP scheme may be at authentication level 2 with an LDAP (Lightweight Directory Access Protocol) authentication module to protect Manager-related resource, e.g., URLs, based on a form challenge method. In the form challenge method, an HTML form with one or more text input fields may be used to gather credential information. In some embodiments, the form-based challenge may collect credentials such as username and password, social security number, date of birth, one time password, or a combination of other common parameters.

In an embodiment, a single sign-on session could be generated so that resources having the same authentication level would be accessible by the client upon a successful authentication and authorization of the client to access a resource having a particular authentication level. For example, a user who is authenticated to access resources at level 3 is eligible to access resources protected at authentication level 3 or below. However, if the user is authenticated to access resources at level 2 and then attempts to access resources protected by level 3, the user may be asked to re-authenticate. A single sign-on cookie may be used to identify a client as an authenticated and authorized user of a particular authentication level. In an embodiment, the single sign-on cookie may only be sent to the client over SSL connections and/or be an encrypted cookie.

Each authentication scheme may include one or more authentication modules 206 to validate credentials received from a client. For example, an LDAP authentication module matches the credentials, for example a username and password, provided by the end-user who requests a resource to a user definition that may be stored in an LDAP directory server. In some embodiments, authentication module 206 may include one or more authentication components (e.g., plugins), which may be re-used in one or more authentication modules.

As illustrated in FIG. 2, authentication module 206 may include one or more authentication plugins 208. In some embodiments, a pre-configured module, for example an LDAP authentication module, may include pre-defined authentication plugins. Alternatively, access managers may utilize custom authentication modules that rely on custom plugins developed using an authorization API, for example Java® API, in accordance with some embodiments. In some embodiments, the custom plugins may be developed by an end-user to be added to the library of pre-defined authentication plugins. Custom authentication plugins allow for extending the authentication functionality to perform a specific logical unit of authentication.

In some embodiments, having multiple authentication plugins allows for orchestration of each plugin to perform an authentication function and, depending on success or failure of validation operation, call another authentication plugin within the authentication module. In this type of implementation, each authentication plugin may request additional credential information and/or parameters for authentication to be used by the requesting authentication plugin. These custom authorization plugins may be used to incorporate existing authorization logic or systems access manager users need to either continue using or migrate from while deploying the access manager framework.

Figure 3A:
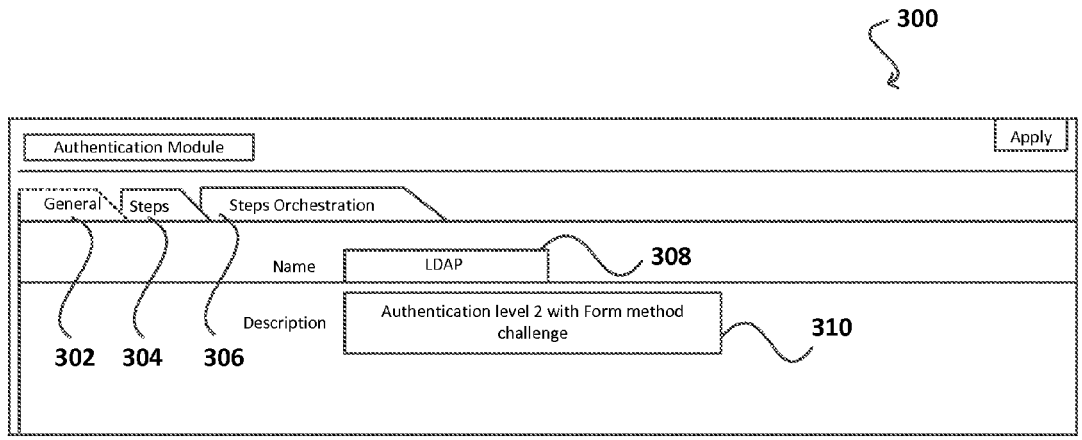
FIG. 3A illustrates a first exemplary user interface in accordance with an embodiment.
Figure 3B:
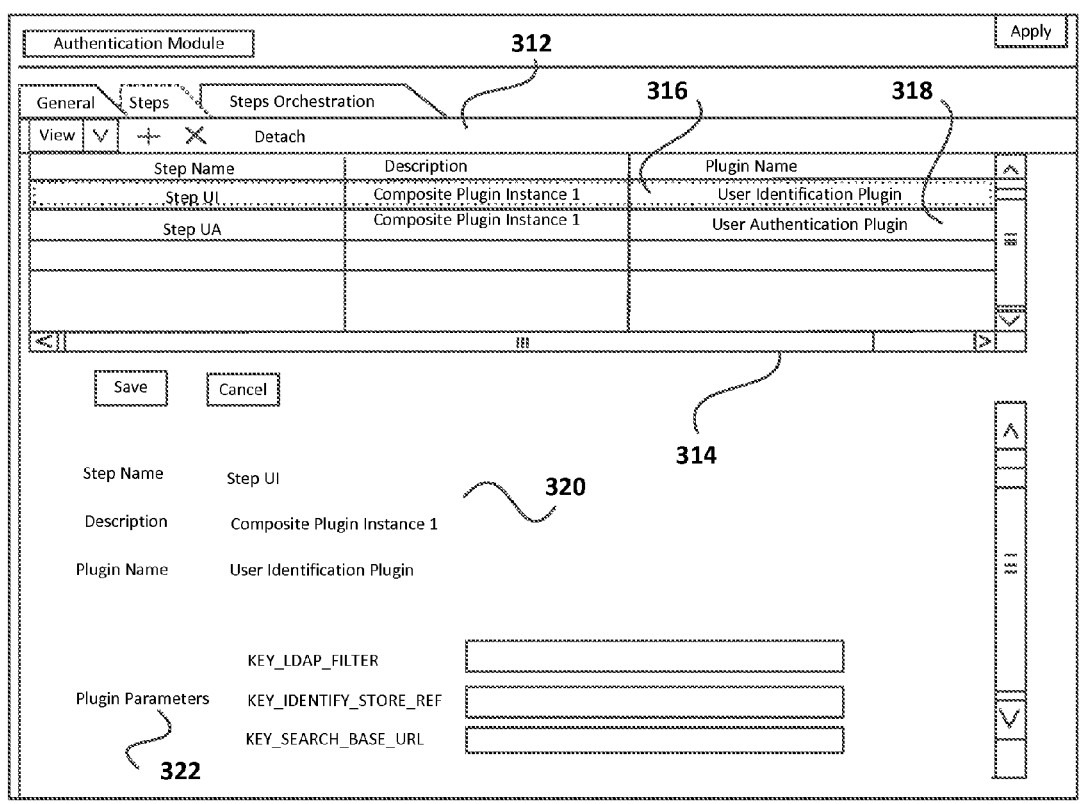
FIG. 3B illustrates a second exemplary user interface in accordance with an embodiment.
Figure 3C:
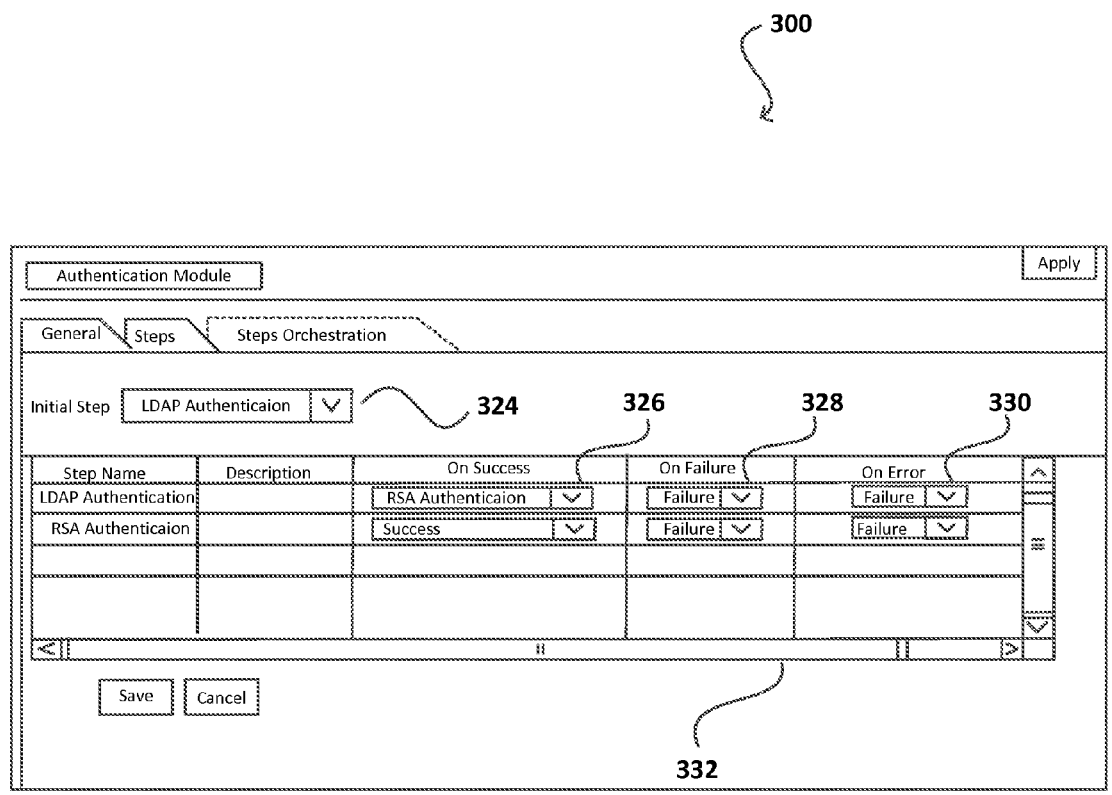
FIG. 3C illustrates a third exemplary user interface in accordance with an embodiment.

In order to create a custom authentication module or view pre-configured authentication modules and/or plugins, user interface 300 as shown in FIGS. 3A-3C is provided. User interface 300 would allow a user to view pre-configured authentication modules and their associated authentication steps and/or to edit or re-configure authentication modules to create custom authentication modules which fit specific user needs. In some embodiments, a new custom authentication module may be defined using pre-configured or custom authentication steps through the user interface 300.

As shown in the exemplary user interface 300, there are three tabs to identify the authentication module, the authentication plugin(s) associated with the authentication module, and authentication plugin orchestration within the authentication module. Tab 302 may provide general information regarding a specific authentication module being viewed, edited, or created. Boxes 308 and 310 provide space for a user to view the existing information related to an authentication module. In some embodiments, information displayed by boxes 308 and 310 may be modified and added by a user of the user interface 300. For example, user interface 300 may display a pre-configured LDAP authentication module general information. In this example, boxes 308 and 310 may display LDAP as the name of authentication module and provide LDAP's authentication level and challenge mechanism as the description used by the LDAP authentication scheme. In some embodiments, information displayed by boxes 308 and 310 may be optionally provided with a specific range for number of characters used in boxes 308 and 310. For example, box 310 may only display up to a maximum of 250 characters.

User interface 300 includes additional tabs 304 and 306. As illustrated in FIG. 3B, tab 304 may be configured to show available steps for the displayed authentication module, for example, using table 314. In an embodiment, an LDAP authentication module may have two pre-configured steps as shown in table 314. It should be understood that each authentication module may have any number of authentication steps therein and is not limited to the number of authentication steps shown in table 314.

Upon user selection of tab 304, portion 312 is provided in user interface 300. Portion 312 may be represented as a toolbar in some embodiments. Portion 312 may include several interactive items, which may be used to perform different functions upon a user input. In some embodiments, the interactive items of toolbar 312 may be represented as buttons which may be selected by a user through a user input device.

In some embodiments, portion 312 may include a command button which may be used to alter the appearance of the table 314 based on different available parameters. Additionally, portion 312 may also include command buttons for addition and deletion of one or more authentication plugins provided by user interface 300 to create custom authentication modules.

Within table 314, there may be one or more authentication plugins provided. For example, authentication plugins 316 and 318 may be displayed by the user interface 300. Table 314 may include populated information for each authentication plugin 316 and 318 once the relevant information for each authentication plugin is defined. For example, each authentication plugin may be identified by a step name upon creation of the authentication plugin. In addition, an optional step description plugin name to further identify each authentication step of the authentication module.

As each of the displayed authentication steps is selected, related information for the selected authentication step may be displayed below table 314 along with related plugin parameters 322 for the selected authentication step, in accordance with some embodiments. For example, the plugin parameters may include an identity store associated with the authentication step.

Upon user selection of tab 306, portions 324 and 332 are provide in the user interface 300 for orchestration of authentication steps within an authentication module. As illustrated in FIG. 3C, portion 324 allows for selection of an initial step within an authentication flow from available authentication steps defined for the authentication module. For instance, LDAP authentication may be selected as an initial step of the authentication process within the authentication module using portion 324. In some embodiments, portion 324 may be a drop down menu, a set of radio buttons, or any other selection means able to select an authentication step from multiple authentication steps.

In an embodiment, each authentication step may include additional information as the orchestration configuration of authentication step within an authentication module is completed. Such additional information can define different actions that may be taken when the execution of the authentication step results in success, failure, or error. For each authentication step, drop down menus 326, 328, and 330 may enable selection of proper actions to be taken for each scenario. For example, drop down menu 326 may include different available actions to be selected upon successful operation of LDAP authentication step. As shown in FIG. 3C, upon successful operation of LDAP authentication step, another authentication step, for example RSA (an algorithm desiged by Ron Rivest, Adi Shamir, and Leonard Adleman), authentication step, may be selected to be operated thereafter. As another example, drop down menu 330 may provide available actions to be taken in case of an error in operation of the LDAP authentication step shown in FIG. 3C. In an embodiment, available options presented by drop down menu 330 may include success to indicate successful authentication, failure to indicate failed authentication, or another authentication step name to be executed for further processing. It should be noted that other authentication method, for example X509 or KERBEROS, may be used in addition to LDAP and RSA authentication method used for authentication steps mentioned above.

Generally, access manager frameworks are designed to be stateless frameworks using stateless communication protocols. This leads to simpler and more effective access manager server designs as the needs to dynamically allocate storage and keep track of all the ongoing communications between the access manager servers and high volume of clients are eliminated. This way, an access manager server may process each request individually irrespective of any related previous requests made during a communication session of a client and the access manager server as there is no session information stored in stateless access managers prior to authentication of a user.

As illustrated in FIG. 3C, static orchestration of authentication steps in a multi-step authentication process may arrange each authentication step of the authentication module in a pre-defined order, where each authentication step may require different credential information for proper operation. If an authentication plugin in a multi-step authentication module within an stateless access manager framework requests for additional credential information during the course of authentication process, the requested credential are generally submitted to the first authentication step of the authentication process irrespective of the authentication step that requested the credential information. For example, if an authentication process includes four authentication steps with the fourth step requesting additional credential information, the requested credential information is submitted to the first authentication step. As a result, the requested credential information may sequentially be passed on to the next authentication steps of the authentication process until the additional credential information reaches the fourth step, which originally requested the additional credential information.

In order to avoid passing on the requested credential information sequentially from the first authentication step to the appropriate authentication step, a state driven orchestration of authentication steps may be used so that all received credential information can be directed to the proper authentication step that requested the credential information irrespective of the place of the authentication step within the orchestrated plugins of the authentication process. This way, initial authentication steps within the multi-step authentication module may be bypassed, and the requested credential information may be sent directly to the appropriate authentication step.

Figure 4:
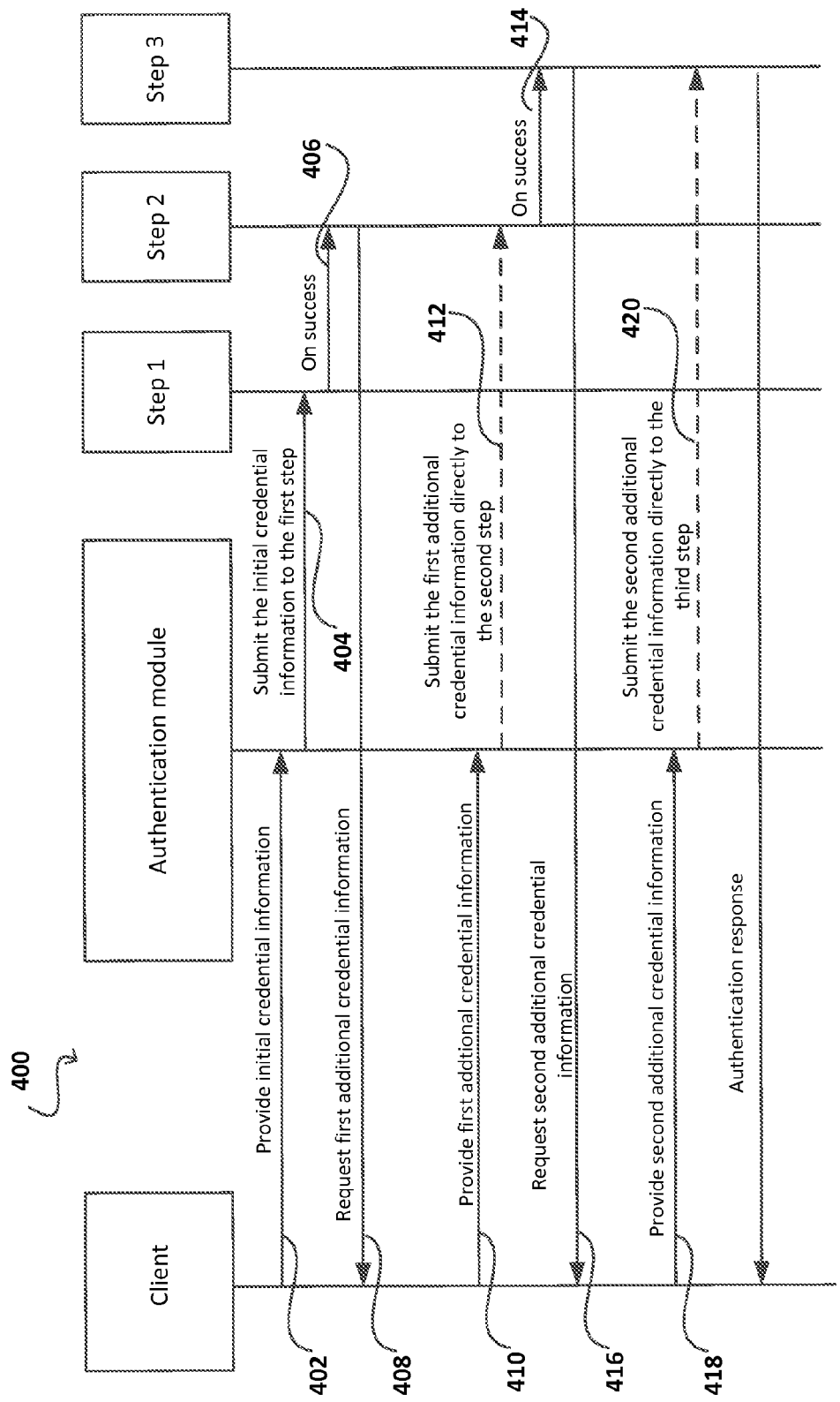
FIG. 4 illustrates exemplary authentication process flow in accordance with an embodiment.

FIG. 4 illustrates an exemplary authentication process flow with a state driven orchestration of the authentication steps where the state of execution for the authentication steps within the authentication module is saved using an authentication context, in accordance with some embodiments. For example, a client may request access to a protected resource, which requires authentication using an authentication module with three authentication plugins, and the authentication module creates an authentication context in response to receiving the request to access the protected resource.

The authentication context is a collection of relevant information regarding the authentication process. For example, the authentication context may contain provided credentials from the beginning of the authentication process up to the execution point of the authentication process or may contain information regarding the current authentication step being performed in a multi-step authentication process to provide a state of execution of the authentication process. The created authentication context may initially include several pieces of information such as initial credential information and details pertinent to the requested resource. As the authentication process is executed in multi-step authentication process, the authentication context is updated to add new information or edit existing information of the authentication context for a state driven authentication plugin orchestration.

In an embodiment, the authentication context may be passed to the client requesting the resource so that the client provides the authentication context along with each additional credential for a multi-step authentication process. This way, the authentication module may receive information indicating the current execution state of the authentication process, which in turns allows for the authentication module to directly pass the additional credential information received with the authentication context to the correct authentication plugin. In some embodiments, the authentication context may be persisted in a web cookie to be saved on the client's browser when the client requests access to a web based resource.

As illustrated in FIG. 4, the authentication module may receive the request from the client in process 402. The authentication module produces the authentication context and proceeds with processing the client request in process 404. Since the current step of the authentication process has not been set for the created authentication context, the authentication module will submit the request for a resource and the initial credential received from the client to the first plugin of the authentication flow using the static orchestration information.

As the initial credential information is successfully validated by the first authentication step in process 406, the authentication module updates the authentication context to save the execution state of the authentication process. In addition, the static orchestration configuration is consulted to determine the next authentication step within the authentication module to pass on the request to, in accordance with an embodiment.

If the second authentication step requires additional credential information, the updated authentication context is sent along with a request to the client asking for additional credential information in process 408. This way, the client may provide the additional credential information with information indicating the current authentication step that may process the additional credential information as shown in process 410. As illustrated in process 412 of FIG. 4, the authentication module may pass on the additional credential information directly to the next authentication step for further processing. This advantageous process will reduce the system load and resource usage while processing the authentication process in a faster and more efficient manner.

In an embodiment, the additional credential may be successfully validated and the static orchestration is consulted to further determine the next authentication step of the authentication in process 414. The authentication context may be updated to reflect the latest execution state of the authentication process to be sent to the client along with a request for a second set of additional credential information required by the current authentication plugin in process 416. Consequently, the client may furnish the requested second set of additional credential information and information identifying the current authentication step asking for the second set of additional credential information in process 418 so that the authentication module could directly submit the second set of additional credential information to the current authentication step of the authentication module in process 420.

Figure 5:
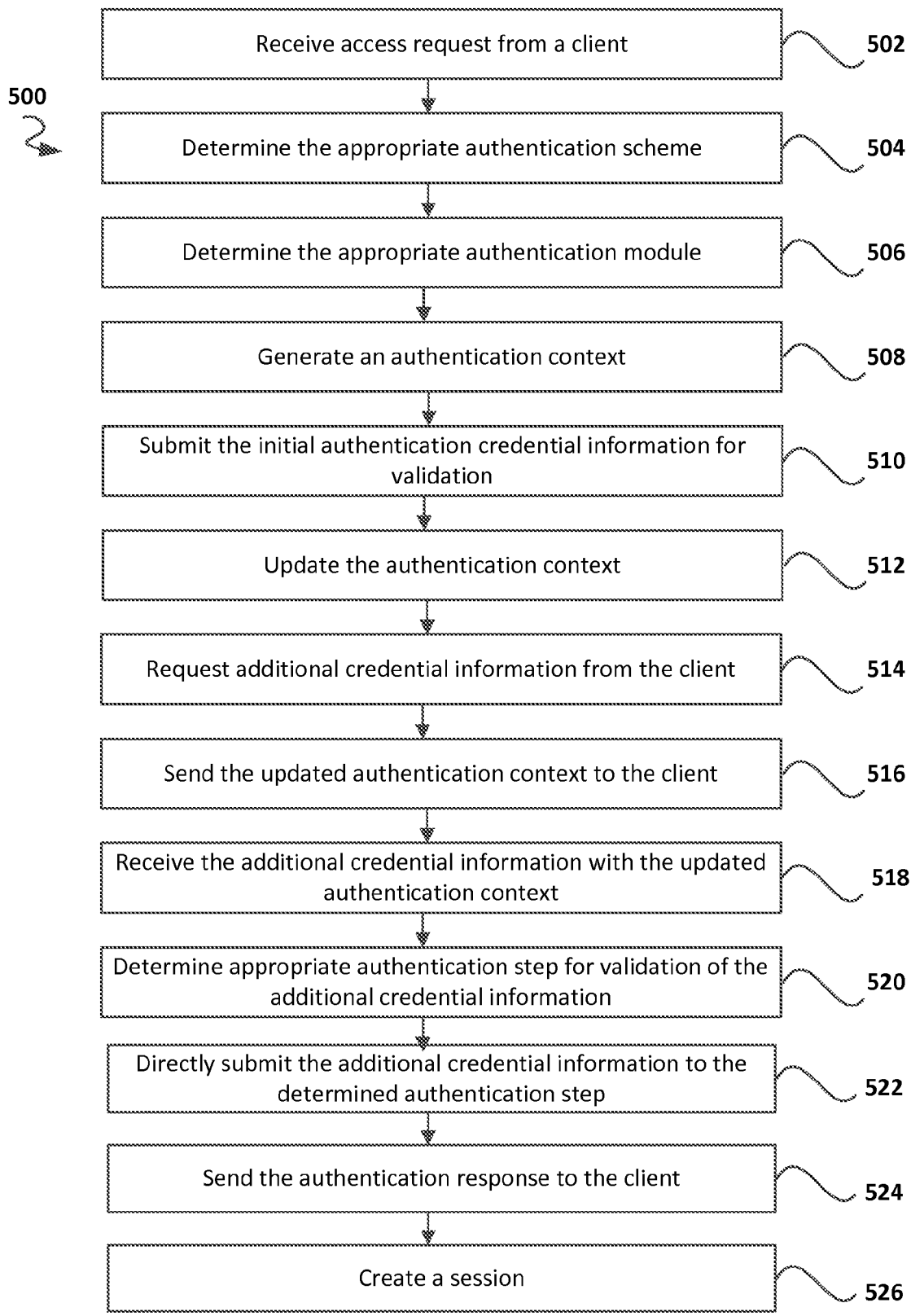
FIG. 5 illustrates operations performed in processing a request to access a protected resource in accordance with an embodiment.

FIG. 5 is a flowchart 500 of steps performed for authenticating a request to access a protected resource from a client, in accordance with embodiments of the present invention. Flowchart 500 includes processes of the present invention which, in one embodiment, are carried out by processors and electrical components under the control of computer readable and computer executable instructions. Although specific steps are disclosed in flowchart 500, such steps are exemplary. That is, the present invention is well suited to performing various other steps or variations of the steps recited in the figure. Within the present embodiment, it should be appreciated that the steps of flowchart 500 may be performed by software, by firmware, by hardware or by any combination of software, firmware and hardware.

In operation 502 of process 500, a request for access a resource is received by an access manager server from a client, e.g., resource 112, access manager server 102, and client 106 of FIG. 1, respectively, in an embodiment. It is noted that the request can be initially received by an agent, e.g., agent 108 of FIG. 1, and then passed to the access manager for an authentication process for when the resource is protected by the access manager server.

In operation 504 of process 500, the access manager may determine the appropriate authentication scheme(s), e.g., access manager 202 and authentication scheme 204 of FIG. 2, that may be assigned to protect a resource based on given policies. In Operation 506, an appropriate authentication module, e.g., authentication module 206 of FIG. 2, for the authentication process of the client may be determined based at least in part upon information included in the determined authentication scheme. In some embodiments, a user interface, e.g., user interface 300 as shown in FIGS. 3A-3C, may be provided so that a user can configure a static orchestration of the authentication steps for the authentication module.

In operation 508 of process 500, an authentication context may be generated to provide for state driven orchestration of the authentication plugins. The authentication context may include the initial credentials collected by the credential collector from the client, in accordance with some embodiments.

In operation 510 of process 500, the authentication module may submit the initial credential from the client to a first authentication step of the authentication module using the static orchestration of authentication plugins as the authentication context has not been updated with the current authentication step to be executed next in the authentication process, in accordance with an embodiment.

In operation 512 of process 500, the authentication context is updated so that it may include the current execution state of the authentication process upon successful validation of the initial credential information by the first authentication plugin, e.g., authentication step 316 of FIG. 3B, of the authentication module. In an embodiment, the static orchestration of authentication steps as shown in FIG. 3C may be consulted with to determine the next step of the authentication process so that the context information may be updated with the current execution state of the authentication process.

In operation 514 of process 500, the request for access to the resource may be sent to the next authentication step upon successful validation of initial credential information by the first authentication plugin. Additional credential information may be requested by the next authentication plugin if additional credential information is needed for the next authentication step within the authentication process. In some embodiments, a credential collector prompts the user for additional credential information and collects the necessary information.

In operation 516 of process 500, the updated context information may be sent to the client so that it may be stored to be sent back later to authentication module. In some embodiments, the updated context information may be persisted in a cookie that may be sent to and get stored in a browser of the client.

A cookie, which may be also referred to as an HTTP cookie, web cookie, or browser cookie, is one or more pieces of information sent from a web server and usually stored as text strings on a client's web browser. Cookies may include different types of authentication cookies. In some embodiments, the authentication cookie may be used by a web server to identify whether a user is logged in or not and which user account the user has logged in under so that access to resources may be managed. The authentication cookie allows access mangers to decide whether an access to a protected resource is allowed, restricted, or additional user authentication is required. In some embodiments, an authentication cookie may have higher security requirements. For example, a cookie may be encrypted using an encryption key or only sent through secure communication channels.

In operation 518 of process 500, additional credential information provided by the client may be received along with the updated credential information. In some embodiments, the client may receive a special prompt or a web page requesting for additional credential information. Once the client responds with the additional credential information, this information may be made available to the authentication module through the credential collector. In some embodiments, a cookie including an updated authentication context may be delivered to the authentication module through the credential collector.

In operation 520 of process 500, when the additional credential information and the updated context information is received, the authentication module may analyze the updated context information to determine the current state of execution of the authentication process. In an embodiment, if the context information does not include the current execution state of the authentication flow, the authentication module may treat the additional credential information as a new request for a resource.

In operation 522 of process 500, the additional credential information may be sent directly to the authentication step that initially requested for the additional credential information. In some embodiments, if the authentication module does not receive the current execution state of the authentication process, the authentication module may treat the additional credential information as a new request for a resource and may submit the received credential information to the first step of the authentication process.

In operation 524 of process 500, an authentication response may be sent to the client in response to execution of the last authentication plugin of the authentication process. In an embodiment, a pre-defined URL of a web page included in the authentication scheme of the authentication process may be used to display the authentication response using the client's browser.

Upon successful completion of the authentication process, the client is granted access to the requested resource. In some embodiments, a single sign-on session may be created so that the client may access other resources with the same security level and requirements without the need of additional authentication.

Figure 6:
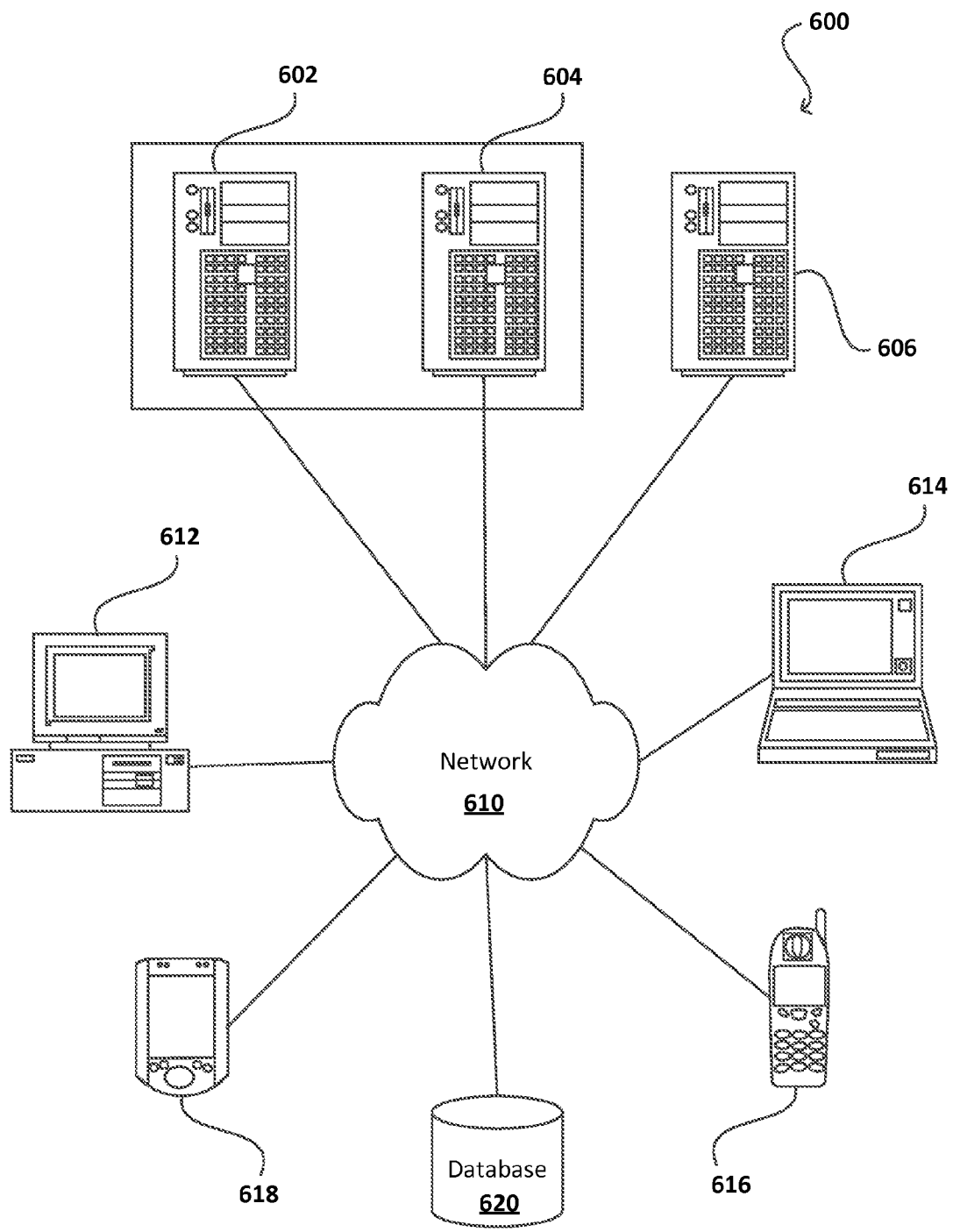
FIG. 6 illustrates components of a computer network that can be used in accordance with one embodiment.

FIG. 6 is a block diagram illustrating components of an exemplary operating environment in which various embodiments of the present invention may be implemented. The system 600 can include one or more user computers, computing devices, or processing devices 612, 614, 616, 618, which can be used to operate a client, such as a dedicated application, web browser, etc. The user computers 612, 614, 616, 618 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 612, 614, 616, 618 may also have any of a variety of applications, including one or more development systems, database client and/or server applications, and Web browser applications. Alternatively, the user computers 612, 614, 616, 618 may be any other electronic device, such as a thin-client computer, Internet-enabled gaming system, and/or personal messaging device, capable of communicating via a network (e.g., the network 610 described below) and/or displaying and navigating Web pages or other types of electronic documents. Although the exemplary system 600 is shown with four user computers, any number of user computers may be supported.

In most embodiments, the system 600 includes some type of network 610. The network may can be any type of network familiar to those skilled in the art that can support data communications using any of a variety of commercially-available protocols, including without limitation TCP/IP, SNA, IPX, AppleTalk, and the like. Merely by way of example, the network 610 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 602, 604, 606 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 606) may be dedicated to running applications, such as a business application, a Web server, application server, etc. Such servers may be used to process requests from user computers 612, 614, 616, 618. The applications can also include any number of applications for controlling access to resources of the servers 602, 604, 606.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 612, 614, 616, 618. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 612, 614, 616, 618.

The system 600 may also include one or more databases 620. The database(s) 620 may reside in a variety of locations. By way of example, a database 620 may reside on a storage medium local to (and/or resident in) one or more of the computers 602, 604, 606, 612, 614, 616, 618. Alternatively, it may be remote from any or all of the computers 602, 604, 606, 612, 614, 616, 618, and/or in communication (e.g., via the network 610) with one or more of these. In a particular set of embodiments, the database 620 may reside in a storage-area network ("SAN") familiar to those skilled in the art. Similarly, any necessary files for performing the functions attributed to the computers 602, 604, 606, 612, 614, 616, 618 may be stored locally on the respective computer and/or remotely, as appropriate. In one set of embodiments, the database 620 may be a relational database, such as Oracle 11g, that is adapted to store, update, and retrieve data in response to SQL-formatted commands.

Figure 7:
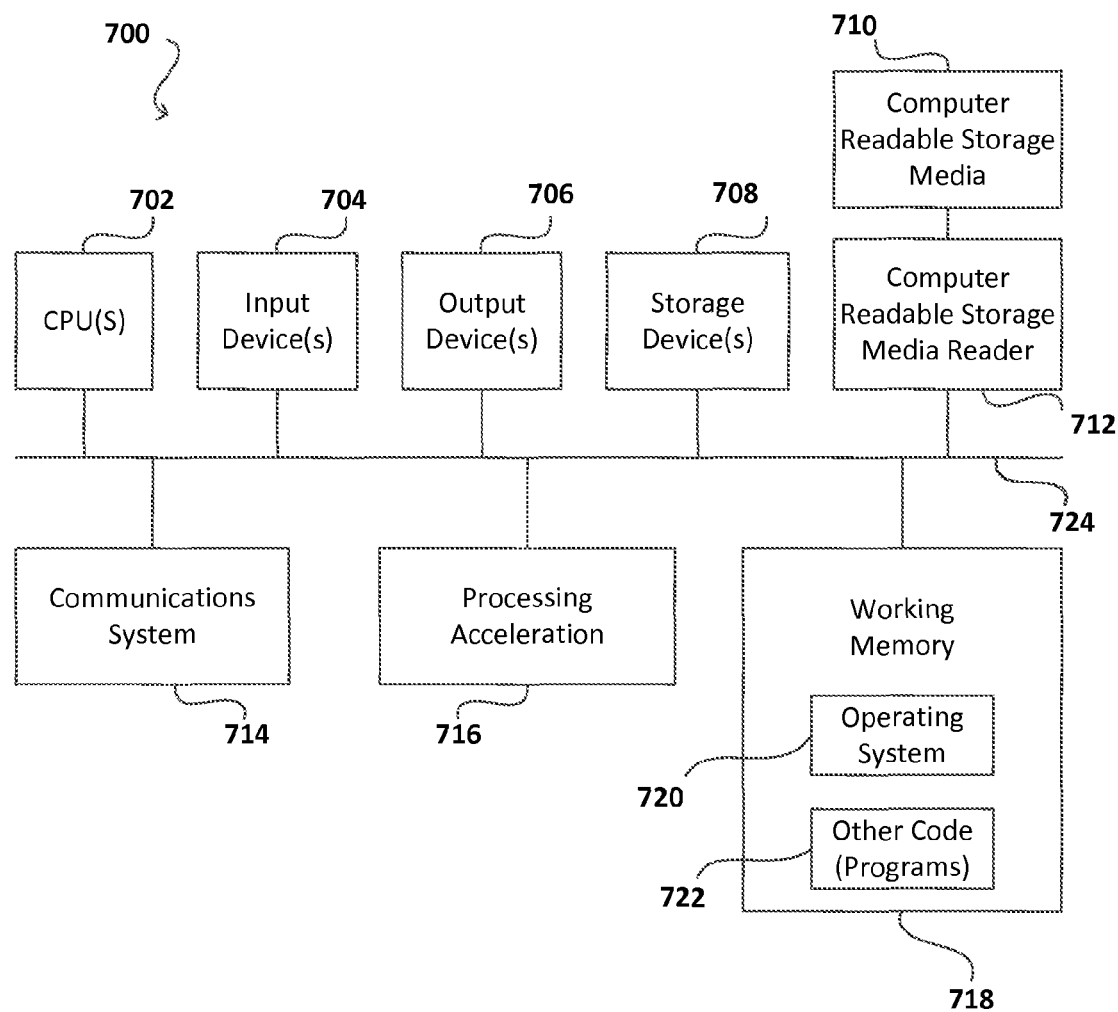
FIG. 7 illustrates components of a computerized device that can be used in accordance with one embodiment.

FIG. 7 illustrates an exemplary computer system 700, in which various embodiments of the present invention may be implemented. The system 700 may be used to implement any of the computer systems described above. The computer system 700 is shown comprising hardware elements that may be electrically coupled via a bus 724. The hardware elements may include one or more central processing units (CPUs) 702, one or more input devices 704 (e.g., a mouse, a keyboard, etc.), and one or more output devices 706 (e.g., a display device, a printer, etc.). The computer system 700 may also include one or more storage devices 708. By way of example, the storage device(s) 708 can include devices such as disk drives, optical storage devices, solid-state storage device such as a random access memory ("RAM") and/or a read-only memory ("ROM"), which can be programmable, flash-updateable and/or the like.

The computer system 700 may additionally include a computer-readable storage media reader 712, a communications system 714 (e.g., a modem, a network card (wireless or wired), an infra-red communication device, etc.), and working memory 718, which may include RAM and ROM devices as described above. In some embodiments, the computer system 700 may also include a processing acceleration unit 716, which can include a digital signal processor DSP, a special-purpose processor, and/or the like.

The computer-readable storage media reader 712 can further be connected to a computer-readable storage medium 710, together (and, optionally, in combination with storage device(s) 708) comprehensively representing remote, local, fixed, and/or removable storage devices plus storage media for temporarily and/or more permanently containing, storing, transmitting, and retrieving computer-readable information. The communications system 714 may permit data to be exchanged with the network and/or any other computer described above with respect to the system 700.

The computer system 700 may also comprise software elements, shown as being currently located within a working memory 718, including an operating system 720 and/or other code 722, such as an application program (which may be a client application, Web browser, mid-tier application, RDBMS, etc.). It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

What is claimed is:

1. A method comprising:
receiving, from a client, a request to access a resource;
determining an authentication process for access to the resource based on the request, wherein determining the authentication process includes determining a plurality of authentication components, and wherein the plurality of authentication components includes a first authentication component and a second authentication component;
based on the determined authentication process, performing, using the first authentication component, a first authentication for the client;
sending, based on the first authentication, an authentication context to the client, wherein the authentication context indicates an execution state of the authentication process;
receiving, from the client, the authentication context;
based on the execution state indicated by the authentication context, determining the second component as a next component in the authentication process; and
based on the execution state indicated by the authentication context:
bypassing the first authentication component; and then
sending a request to the second authentication component of the authentication process, to perform a second authentication for the client.

2. The method of claim 1, further comprising:
allowing access to the resource for the client based on the authentication context and the second authentication.

3. The method of claim 1, further comprising:
determining an authentication order for performing the authentication process using the plurality of authentication components;
wherein the authentication process is determined based at least in part on the request.

4. The method of claim 3, wherein the execution state indicates an authentication component that is next in the authentication order for the authentication process.

5. The method of claim 1, wherein the authentication context includes credential data validated for the user for each authentication component of the plurality of authentication components for which an authentication is performed for the authentication process.

6. The method of claim 1, wherein the authentication context is sent to the client with a request for credential information, and wherein the credential information is for the second authentication using the second authentication component.

7. The method of claim 2, further comprising:
generating a session for allowing access to the resource for the client based on the authentication context and the second authentication.

8. The method of claim 1, wherein the authentication context is implemented as a Hypertext Transfer Protocol (HTTP) cookie.

9. The method of claim 1, wherein the authentication context is implemented as an encrypted cookie.

10. The method of claim 1, wherein the first authentication component is an authentication plugin, and wherein the first authentication component is different from the second authentication component.

11. The method of claim 1, wherein the resource includes an application.

12. The method of claim 1, wherein the authentication context is represented as a Java® object.

13. A system comprising:
a memory; and
one or more processors operatively coupled to the memory and configured to:
receive, from a client, a request to access a resource;
determine an authentication process for access to the resource based on the request, wherein determining the authentication process includes determining a plurality of authentication components, and wherein the plurality of authentication components includes a first authentication component and a second authentication component;
based on the determined authentication process, perform, using the first authentication component, a first authentication for the client;
send, based on the first authentication, an authentication context to the client, wherein the authentication context indicates an execution state of the authentication process;

receive, from the client, the authentication context;

based on the execution state indicated by the authentication context, determine the second component as a next component in the authentication process;

based on the execution state indicated by the received authentication context:

bypass the first authentication component; and then send a request to the second authentication component of the authentication process, to perform a second authentication for the client; and allow access to the resource based on the authentication context and the second authentication.

14. The system of claim 13, wherein the one or more processors are further configured to:

determine an authentication order for performing the authentication process using the plurality of authentication components;

wherein the authentication process is determined based at least in part on the request.

15. The system of claim 13, wherein the execution state indicates an authentication component that is next in the authentication order for the authentication process.

16. A non-transitory machine-readable medium storing instructions that, when executed by one or more processors, cause the one or more processors to:

receive, from a client, a request to access a resource;

determine an authentication process for access to the resource based on the request, wherein determining the authentication process includes determining a plurality of authentication components, and wherein the plurality of authentication components includes a first authentication component and a second authentication component;

based on the determined authentication process, perform, using the first authentication component, a first authentication for the client;

send, based on the first authentication, an authentication context to the client, wherein the authentication context indicates an execution state of the authentication process;

receive, from the client, the authentication context;

based on the execution state indicated by the authentication context, determine the second component as a next component in the authentication process; and based on the execution state indicated by the authentication context:

bypass the first authentication component; and then send a request to the second authentication component of the authentication process, to perform a second authentication for the client.

17. The non-transitory machine-readable medium of claim 16, wherein the instructions, when executed by the one or more processors, further cause the one or more processors to:

generate a session for allowing access to the resource for the client based on the authentication context and the second authentication.

18. The non-transitory machine-readable medium of 16, wherein the instructions, when executed by the one or more processors, further cause the one or more processors to:

allow access for the client to a plurality of resources including the resource, wherein the access is allowed based on the authentication context and the second authentication.

19. The non-transitory machine-readable medium of claim 16, wherein the authentication context includes credential data validated for the user for each authentication component of the plurality of authentication components for which an authentication is performed for the authentication process.

* * * * *